United States Patent
Yamada (10) Patent No.: US 9,781,286 B2
(45) Date of Patent: Oct. 3, 2017

(54) COMMUNICATION SYSTEM, COMMUNICATION METHOD, AND STORAGE MEDIUM

(71) Applicant: CANON KABUSHIKI KAISHA, Tokyo (JP)

(72) Inventor: Tetsuya Yamada, Matsudo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 15/275,803

(22) Filed: Sep. 26, 2016

(65) Prior Publication Data
US 2017/0094089 A1 Mar. 30, 2017

(30) Foreign Application Priority Data
Sep. 28, 2015 (JP) .................................. 2015-189539

(51) Int. Cl.
*H04N 1/00* (2006.01)

(52) U.S. Cl.
CPC ....... *H04N 1/00933* (2013.01); *H04N 1/0097* (2013.01); *H04N 1/00344* (2013.01); *H04N 1/00347* (2013.01); *H04N 2201/0094* (2013.01)

(58) Field of Classification Search
None
See application file for complete search history.

(56) References Cited

U.S. PATENT DOCUMENTS

| 2004/0036635 A1* | 2/2004 | Kimura | H03M 7/4006 341/107 |
|---|---|---|---|
| 2014/0071476 A1* | 3/2014 | Aritomi | G06F 3/1222 358/1.14 |
| 2015/0277826 A1* | 10/2015 | Yanagawa | G06F 3/1253 358/1.15 |

FOREIGN PATENT DOCUMENTS

| JP | 2012123573 A | 6/2012 |
| JP | 2014220579 A | 11/2014 |

* cited by examiner

*Primary Examiner* — Allen H Nguyen
(74) *Attorney, Agent, or Firm* — Rossi, Kimms & McDowell LLP

(57) ABSTRACT

An information processing apparatus capable of preventing load on synchronization processing from increasing more than necessary. The information processing apparatus updates existing setting values based on a synchronization setting value group received from a server, including setting values to be synchronized. Whether or not all the existing setting values are setting values to be synchronized is determined, and if all of the existing setting values are setting values to be synchronized, setting values corresponding to the synchronization setting value group are collectively deleted from the existing setting values, and those included in the synchronization setting value group are set in place, whereas if any of the existing setting values is a setting value not required to be replaced, the existing setting values are updated, individually for each setting value included in the group without collectively deleting the setting values corresponding to the group from the existing setting values.

8 Claims, 8 Drawing Sheets

| USER ID | PASSWORD | READING | DEPARTMENT ID |
|---|---|---|---|
| honda | *** | HONDA | 0000001 |
| yoshida | *** | YOSHIDA | 0000001 |
| nagatomo | *** | NAGATOMO | 0000003 |
|  |  |  |  |

| DEPARTMENT ID | TOTAL OUTPUT COUNT | TOTAL OUTPUT UPPER LIMIT | COLOR OUTPUT COUNT | COLOR OUTPUT UPPER LIMIT |
|---|---|---|---|---|
| 0000001 | 3876 | 5000 | 1632 | 3000 |
| 0000002 | 2367 | 5000 | 751 | 3000 |
| 0000003 | 18445 | 20000 | 18445 | 20000 |

FIG. 6B

| DEPARTMENT ID | TOTAL OUTPUT COUNT | TOTAL OUTPUT UPPER LIMIT | COLOR OUTPUT COUNT | COLOR OUTPUT UPPER LIMIT |
|---|---|---|---|---|

FIG. 6C

| DEPARTMENT ID | TOTAL OUTPUT COUNT | TOTAL OUTPUT UPPER LIMIT | COLOR OUTPUT COUNT | COLOR OUTPUT UPPER LIMIT |
|---|---|---|---|---|
| 0000001 | 0 | 4000 | 0 | 3000 |
| 0000002 | 0 | 5000 | 0 | 3000 |
| 0000003 | 0 | 20000 | 0 | 20000 |

FIG. 6D

| DEPARTMENT ID | TOTAL OUTPUT COUNT | TOTAL OUTPUT UPPER LIMIT | COLOR OUTPUT COUNT | COLOR OUTPUT UPPER LIMIT |
|---|---|---|---|---|
| 0000001 | 3876 | 4000 | 1632 | 2000 |
| 0000002 | 2367 | 5000 | 751 | 3000 |
| 0000003 | 18445 | 20000 | 18445 | 20000 |

```
<?xml version="1.0" encoding="utf-8"?>
<sync_info xmlns="http://www.canon.com/ns/sync_info">
<device_settings>
```
800

801 — SYNCHRONIZATION SETTING VALUE GROUP

```
</device_settings>
<departmentID_management>
```

802 — SYNCHRONIZATION SETTING VALUE GROUP

```
</departmentID_management>
<user_info>
```

803 — SYNCHRONIZATION SETTING VALUE GROUP

```
</user_info>
<personal_data>
```

804 — SYNCHRONIZATION SETTING VALUE GROUP

```
</personal_data>
</sync_info>
```

FIG. 9

```
     <departmentID_management>
802─ <X-time-server>2014-08-06T20:20:52.382</X-time-server>
     <departmentIDs>
     ┌<<departmentID>
     │  <ID>0000001</ID>
901─│  <limit>4000</limit>
     │  <limit_color>2000</limit_color>
     └</departmentID>
      <departmentID>
       <ID>0000004</ID>
       <limit>1000</limit>
       <limit_color>50</limit_color>
      </departmentID>
     </departmentIDs>
     <deleted_departmentIDs>
      <deleted_departmentID>
       <ID>0000002</ID>
      </deleted_departmentID>
     </deleted_departmentIDs>
     </departmentID_management>
```

*FIG. 10*

COMMUNICATION SYSTEM, COMMUNICATION METHOD, AND STORAGE MEDIUM

BACKGROUND OF THE INVENTION

Field of the Invention

The present invention relates to a communication system, a communication method, and a storage medium, and more particularly to a communication system that synchronizes various setting values, a communication method, and a storage medium.

Description of the Related Art

There has been known a communication system that stores various setting values which are used by each of a plurality of MFPs as information processing apparatuses, in a server. The server is capable of sharing (synchronizing) some setting values with a plurality of MFPs. In the communication system, some users can change various setting values, and for example, when a setting value stored in the server is changed by a user, the changed setting value is transmitted to each MFP. Each MFP sets the received setting value i.e. the changed setting value, as a new setting value, to thereby synchronize the setting value used thereby with the setting value stored in the server (see Japanese Patent Laid-Open Publication No 2014-220579).

In the communication system, when synchronizing a plurality of setting values stored in the server with each MFP, the server transmits a synchronization setting value group formed by the plurality of setting values to each MFP. Upon receipt of the synchronization setting value group, each MFP deletes ones of various setting values set in the MFP, which correspond to the setting values included in the synchronization setting value group, and sets the setting values included in the received synchronization setting value group in place of the deleted setting values. Incidentally, various setting values set in an MFP include a setting value which is unique to the MFP, and need not be replaced (hereinafter referred to as "unique setting value"), and a setting value corresponding to the unique setting value is sometimes included in the synchronization setting value group. In this case, if the setting values corresponding to the setting values included in the synchronization setting value group are all deleted from the various setting values set in the MFP, the unique setting value is also deleted. By this deletion, the unique setting value is reset, and as a result, the unique setting value is rewritten. To cope with this, in the communication system, setting values stored in the server and ones of the plurality of setting values set in the MFP, which correspond to the setting values stored in the server, are compared, and setting values having differences are extracted. Further, in the communication system, if an extracted setting value correspond to a unique setting value, the extracted setting value is excluded from the synchronization setting value group to be transmitted to the MFP (see Japanese Patent Laid-Open Publication No. 2012-123573).

However, in the above-described communication system, although unique setting values are not deleted in synchronization processing, it is required to compare the setting values stored in the server and the plurality of setting values set in the MFP to thereby determine whether or not there is a difference between each compared setting values. Therefore, load on synchronization processing increases as the number of setting values to be compared increases.

SUMMARY OF THE INVENTION

The present invention provides a communication system that is capable of preventing load on synchronization processing from increasing more than necessary, a communication method, and a storage medium.

In a first aspect of the invention, there is provided a communication system that performs synchronization processing for receiving a synchronization setting value group including setting values to be synchronized, and updating existing setting values based on the received synchronization setting value group, comprising at least one processor and at least one memory coupled to the at least one processor which act as a determination unit configured to determine whether or not all of the existing setting values are the setting values to be synchronized, a first update unit configured to perform first update processing in which setting values included in the synchronization setting value group are collectively deleted from the existing setting values, and the setting values included in the synchronization setting value group are set in place of the deleted setting values, a second update unit configured to perform second update processing in which the existing setting values are updated, individually for each setting value included in the synchronization setting value group without collectively deleting the setting values included in the synchronization setting value group from the existing setting values, and a decision unit configured to decide execution of update processing by the first update unit in a case where all of the existing setting values are the setting values to be synchronized, and decide execution of update processing by the second update unit in a case where any of the existing setting values is a setting value which is not required to be replaced.

In a second aspect of the invention, there is provided a communication method for performing synchronization processing for receiving a synchronization setting value group including setting values to be synchronized, and updating existing setting values based on the received synchronization setting value group, comprising determining whether or not all of the existing setting values are the setting values to be synchronized, performing first update processing in which setting values included in the synchronization setting value group are collectively deleted from the existing setting values, and the setting values included in the synchronization setting value group are set in place of the deleted setting values, performing second update processing in which the existing setting values are updated, individually for each setting value included in the synchronization setting value group without collectively deleting the setting values included in the synchronization setting value group from the existing setting values, and deciding execution of the first update processing in a case where all of the existing setting values are the setting values to be synchronized, and deciding execution of the second update processing in a case where any of the existing setting values is a setting value which is not required to be replaced.

In a third aspect of the invention, there is provided a non-transitory computer-readable storage medium storing a computer-executable program for executing a communication method for performing synchronization processing for receiving a synchronization setting value group including setting values to be synchronized, and updating existing setting values based on the received synchronization setting value group, wherein the method comprises determining whether or not all of the existing setting values are the setting values to be synchronized, performing first update processing in which setting values included in the synchronization setting value group are collectively deleted from the existing setting values, and the setting values included in the synchronization setting value group are set in place of the deleted setting values, performing second update processing in which the existing setting values are updated, individually for each setting value included in the synchronization setting value group without collectively deleting the setting values included in the synchronization setting value group from the existing setting values, and deciding execution of the first update processing in a case where all of the existing setting values are the setting values to be synchronized, and deciding execution of the second update processing in a case where any of the existing setting values is a setting value which is not required to be replaced.

According to the present invention, it is possible to prevent load on synchronization processing from increasing more than necessary.

Further features of the present invention will become apparent from the following description of exemplary embodiments (with reference to the attached drawings).

DESCRIPTION OF THE EMBODIMENTS

The present invention will now be described in detail below with reference to the accompanying drawings showing embodiments thereof.

Figure 1:
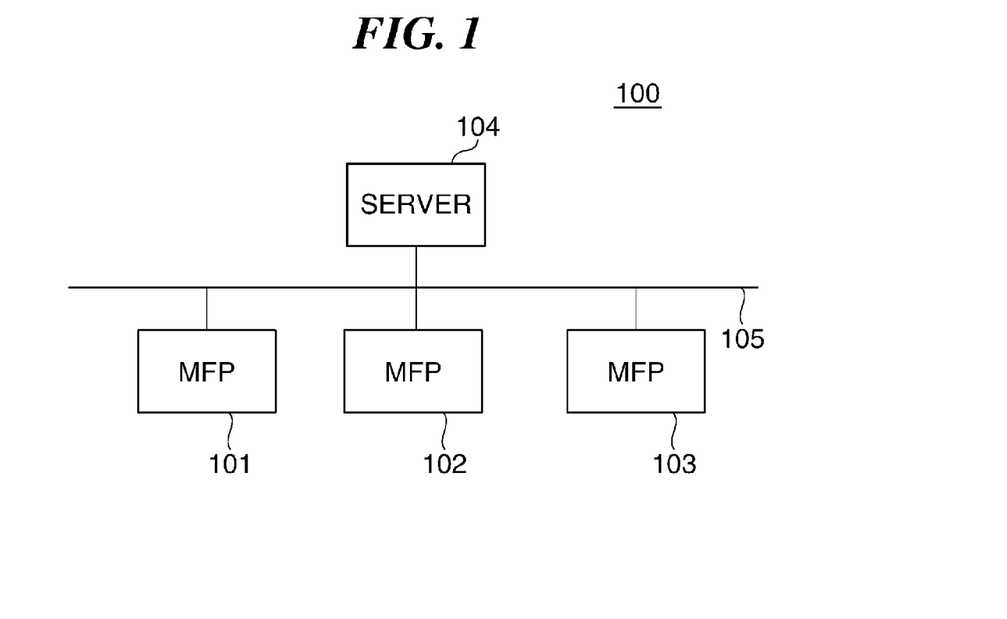
FIG. 1 is a schematic block diagram of a communication system including MFPs as information processing apparatus, according to an embodiment of the present invention.

FIG. 1 is a schematic block diagram of a communication system 100 including MFPs 101 to 103 as information processing apparatuses, according to an embodiment of the present invention.

Referring to FIG. 1, the communication system 100 includes the MFPs 101 to 103, and a server 104, and the MFPs 101 to 103 and the server 104 are interconnected via a network 105.

The MFPs 101 to 103 are each capable of performing various kinds of processing, including print processing, scan processing, and FAX processing, and a plurality of setting values used in each of the various kinds of processing are set in the MFPs 101 to 103. The plurality of setting values set in the MFPs 101 to 103 include setting values to be synchronized (hereinafter referred to as "synchronization target setting values") and unique setting values unique to each of the MFPs 101 to 103. The unique setting values are separately managed by each of the MFPs 101 to 103. On the other hand, the synchronization target setting values are managed by the server 104, and can be shared between the MFPs 101 to 103. Further, the MFPs 101 to 103 are capable of changing the synchronization target setting values. For example, when a synchronization target setting value is changed by an operation on a console section 209 of the MFP 101, described hereinafter with reference to FIG. 2, the MFP 101 notifies the server 104 of information on a change of the synchronization target setting value. On the other hand, when the information on the change of the synchronization target setting value is notified from the server 104, the MFPs 102 and 103 which share the setting value corresponding to the changed synchronization target setting value each acquire the synchronization target setting value changed based on the information on the change, from the server 104, and sets the acquired synchronization target setting value in the MFPs 102 and 103.

The server 104 manages the synchronization target setting values for each of the MFPs 101 to 103 which are connected to the server 104 via the network 105. In a case where the synchronization target setting values of e.g. the MFP 101 out of the MFPs 101 to 103 are not stored in the server 104, the server 104 acquires the synchronization target setting values of the MFP 101 from the MFP 101. The server 104 stores the acquired synchronization target setting values of the MFP 101 in association with the MFP 101. Further, the server 104 is capable of changing the synchronization target setting values, and when a synchronization target setting value shared between the MFPs 101 to 103 is changed by the server 104, the server 104 notifies the MFPs 101 to 103 of information on the change of the synchronization target setting value.

Next, a description will be given of the configuration of the MFPs 101 to 103. In the present embodiment, the MFPs 101 to 103 have the same configuration, and hence the configuration of the MFPs 101 to 103 will be described using the MFP 101 by way of example.

Figure 2:
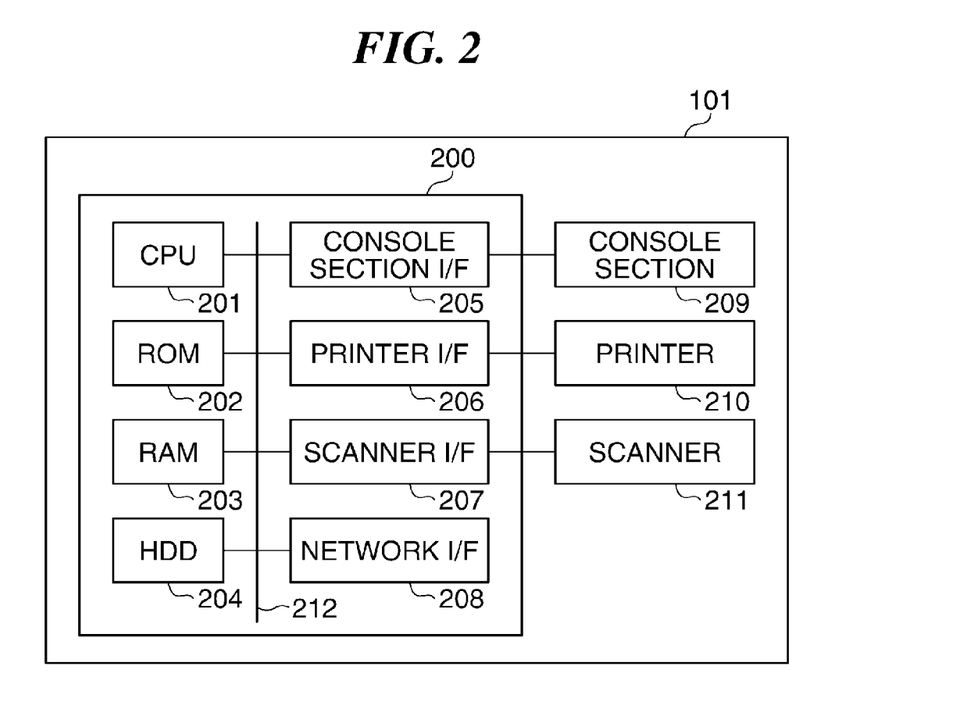
FIG. 2 is a schematic block diagram of an MFP appearing in FIG. 1.

FIG. 2 is a schematic block diagram of the MFP 101 appearing in FIG. 1.

Referring to FIG. 2, the MFP 101 is comprised of a controller 200, the console section 209, a printer 210, and a scanner 211, and the controller 200 is connected to the console section 209, the printer 210, and the scanner 211. The controller 200 includes a CPU 201, a ROM 202, a RAM 203, an HDD 204, a console section interface 205, a printer interface 206, a scanner interface 207, and a network interface 208. These components are interconnected via a system bus 212.

The controller 200 performs centralized control of the overall operation of the MFP 101. The CPU 201 performs various kinds of processing realized by a software module group 300, described hereinafter with reference to FIG. 3, by executing various programs stored in the ROM 202. The ROM 202 stores the various programs and various data used by the CPU 201. The RAM 203 is used as a work area for the CPU 201, and is also used as an area for temporarily storing e.g. intermediate data, which is generated in the various kinds of processing performed by the CPU 201. The HDD 204 stores various data including user management data 400, described hereinafter, and image data, and various programs. The console section interface 205 performs data communication with the console section 209, the printer interface 206 performs data communication with the printer 210, and the scanner interface 207 performs data communication with the scanner 211. The network interface 208 performs data communication with apparatuses connected to the network 105, e.g. the MFPs 102 and 103, and the server 104. In the present embodiment, the network interface 208 receives synchronization data 800, described hereinafter with reference to FIG. 8, including a plurality of synchronization target setting values from the server 104. The console section 209 is used for making settings concerning various kinds of processing performed by the MFP 101, and for example, a synchronization target setting value is changed by a user's operation art the console section 209. The printer 210 acquires print data including information on print processing from the printer interface 206, and performs print processing based on the acquired print data. The scanner 211 reads an original placed on an original platen glass, not shown, to thereby generate image data, and sends the generated image data to the CPU 201 via the scanner interface 207.

Figure 3:
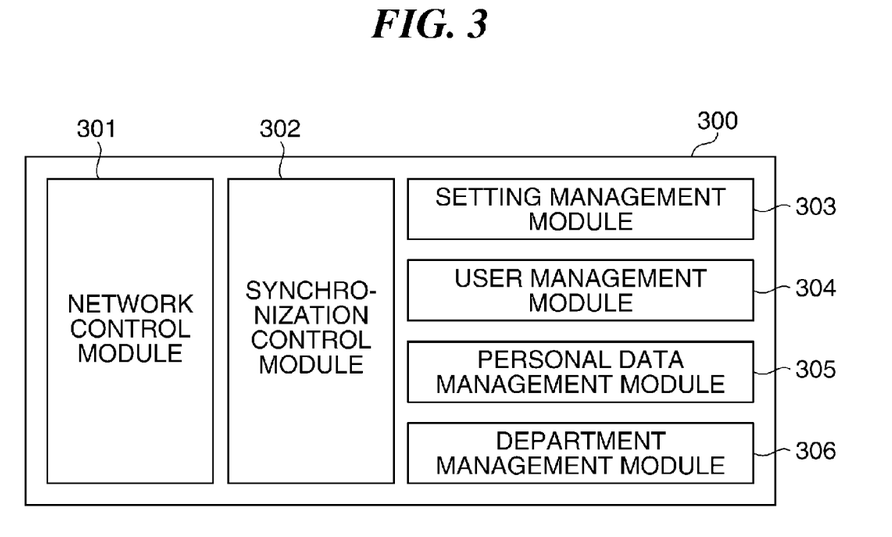
FIG. 3 is a schematic block diagram of software modules of the MFP appearing in FIG. 1.

FIG. 3 is a schematic block diagram of the software module group 300 of the MFP 101 appearing in FIG. 1.

Referring to FIG. 3, the software module group 300 includes a network control module 301, a synchronization control module 302, a setting management module 303, and a user management module 304. The software module group 300 further includes a personal data management module 305 and a department management module 306. Various kinds of processing realized by the software module group 300 are performed by the CPU 201 that executes the various programs stored in the ROM 202.

The network control module 301 controls data communication performed by the network interface 208. The synchronization control module 302 acquires the synchronization data 800, described hereinafter, from the server 104. Further, when a synchronization target setting value out of the various setting values set in the MFP 101 is changed by operating the console section 209, the synchronization control module 302 notifies the server 104 of the information on the change of the synchronization target setting value. The setting management module 303 manages the various setting values set in the MFP 101, including the synchronization target setting values and the unique setting values.

Figure 4:
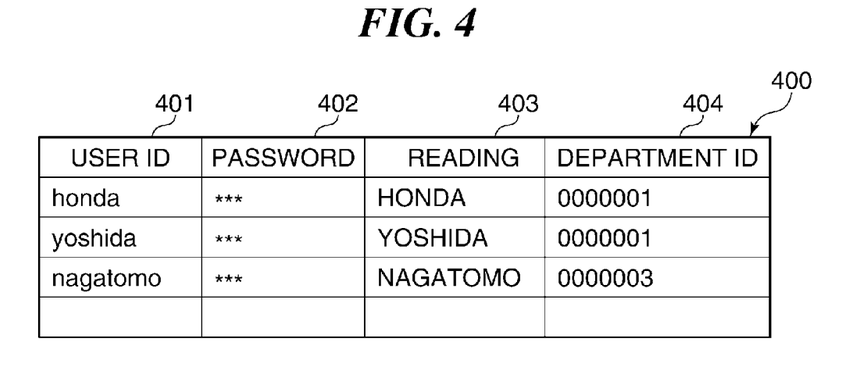
FIG. 4 is a diagram showing an example of user management data managed by a user management module appearing in FIG. 3.

The user management module 304 manages information of users who are allowed to use the MFP 101, and for example, the user management module 304 manages the user management data 400 shown in FIG. 4 including user information. The user management data 400 includes items of a user ID 401, a password 402, a reading 403, and a department ID 404. The user ID 401 is ID information with which a user allowed to use the MFP 101 can be identified, and the password 402 is a password associated with each piece of ID information set as the user ID 401. The reading 403 is a character string which is associated with each piece of ID information set as the user ID 401, and is used for displaying the user information corresponding to each piece of ID information e.g. on a display section, not shown. The department ID 404 is ID information with which a department as a group to which each user belongs can be identified. In the present embodiment, all setting values set as the user management data 400 are synchronization target setting values.

Figure 5:
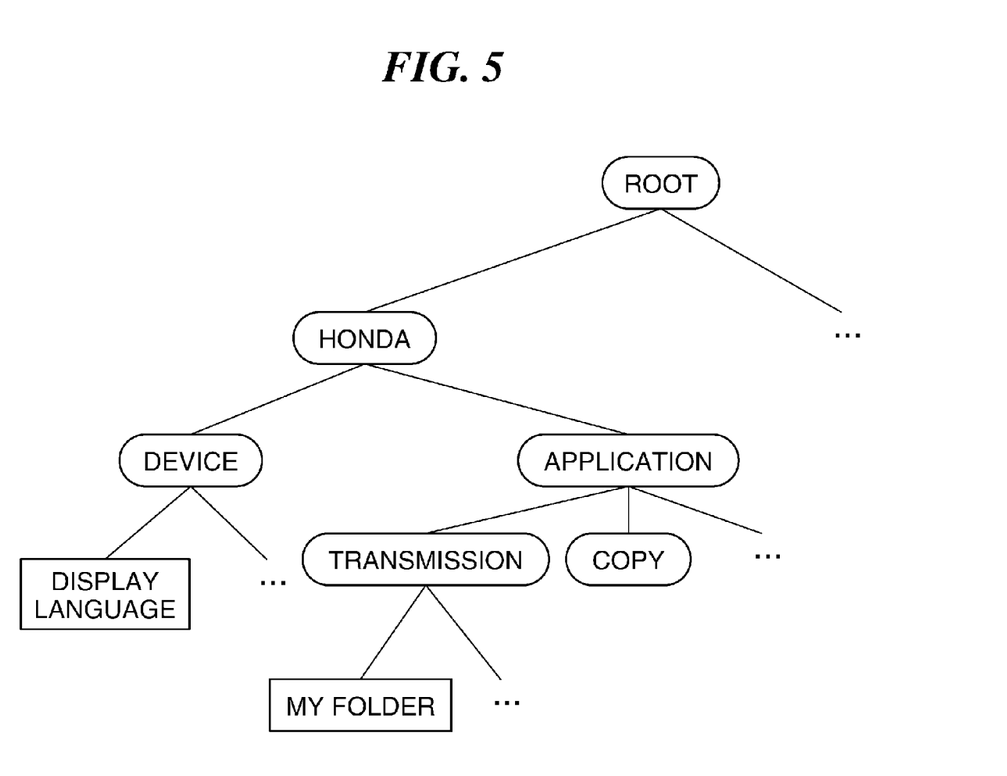
FIG. 5 is a diagram useful in explaining association performed by a personal data management module appearing in FIG. 3.
Figure 6A:
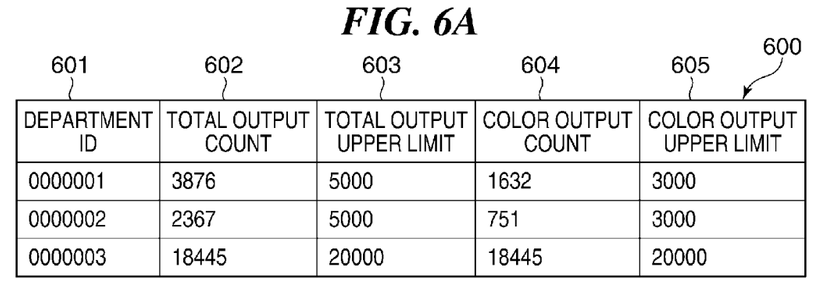
FIGS. 6A to 6D are diagrams each showing an example of printed sheet count management data managed by a department management module appearing in FIG. 3.

The personal data management module 305 manages the configuration of setting values set for each user in the MFP 101, and performs association of types of setting values, on a user-by-user basis, as shown in FIG. 5. The department management module 306 manages actual result values obtained by various kinds of processing performed by each department, and the like, and for example, the department management module 306 manages printed sheet count management data 600 shown in FIG. 6A, including an actual result value indicating the number of sheets printed by each department. The printed sheet count management data 600 includes items of a department ID 601, a total output count 602, a total output upper limit 603, a color output count 604, and a color output upper limit 605. The department ID 601 is ID information for identifying each department, and is associated with the department ID 404 of the user management data 400. The total output count 602 is an actual result value indicating the number of sheets on which users belonging to each department have performed printing using the MFP 101, and the total output upper limit 603 is an upper limit value of the number of sheets allowed to be printed, which is set on a department-by-department basis. The color output count 604 is an actual result value indicating the number of sheets on which users belonging to each department have performed color printing using the MFP 101, and the color output upper limit 605 is an upper limit value of the number of sheets allowed to be color-printed, which is set on a department-by-department basis. In the present embodiment, out of the setting values set in the printed sheet count management data 600, setting values which are set as the department ID 601, the total output upper limit 603, and the color output upper limit 605, respectively, are the synchronization target setting values. On the other hand, out of the setting values set in the printed sheet count management data 600, setting values which are set as the total output count 602 and the color output count 604, respectively, are the unique setting values of the MFP 101, i.e. setting values which need not be replaced in synchronization processing (hereinafter referred to as the "replacement unrequired setting value"). Therefore, the printed sheet count management data 600 is management data in which the synchronization target setting values and the replacement unrequired setting values are mixed.

Figure 7:
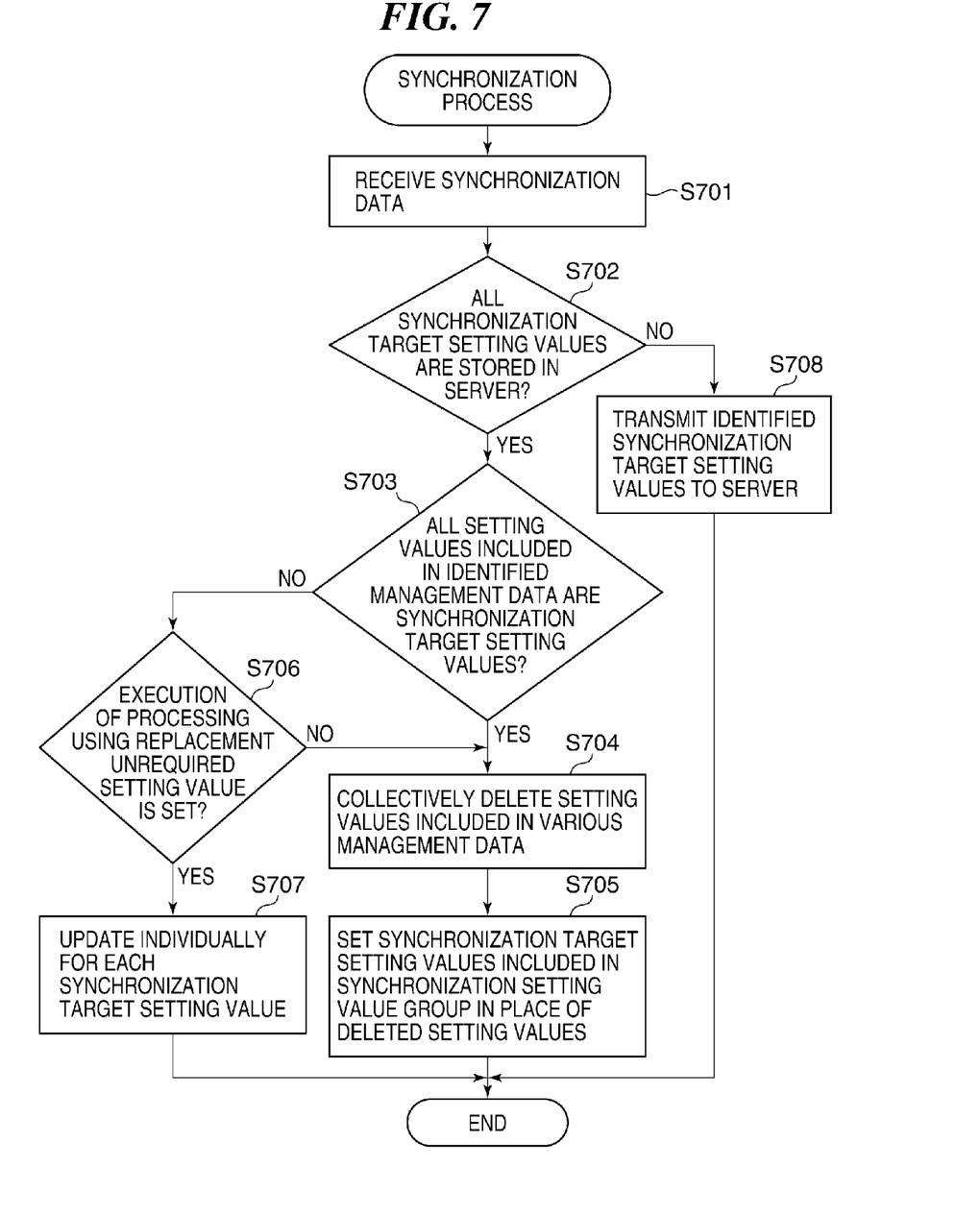
FIG. 7 is a flowchart of a synchronization process performed by the MFP appearing in FIG. 1.

FIG. 7 is a flowchart of a synchronization process performed by the MFP 101 appearing in FIG. 1.

The process in FIG. 7 is performed by the CPU 201 that executes the various programs stored in the ROM 202.

Figure 6B:
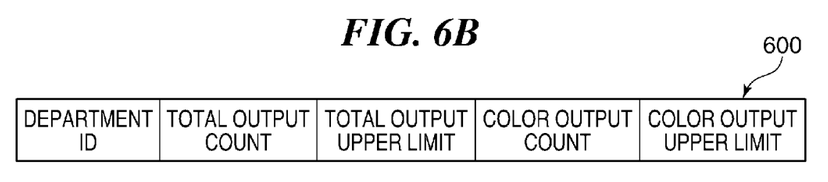
Figure 6C:
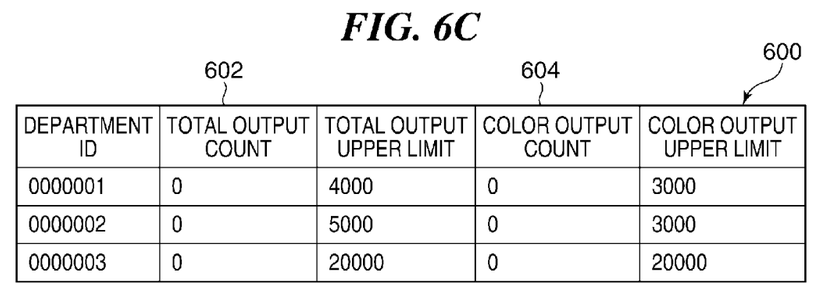
Figure 8:
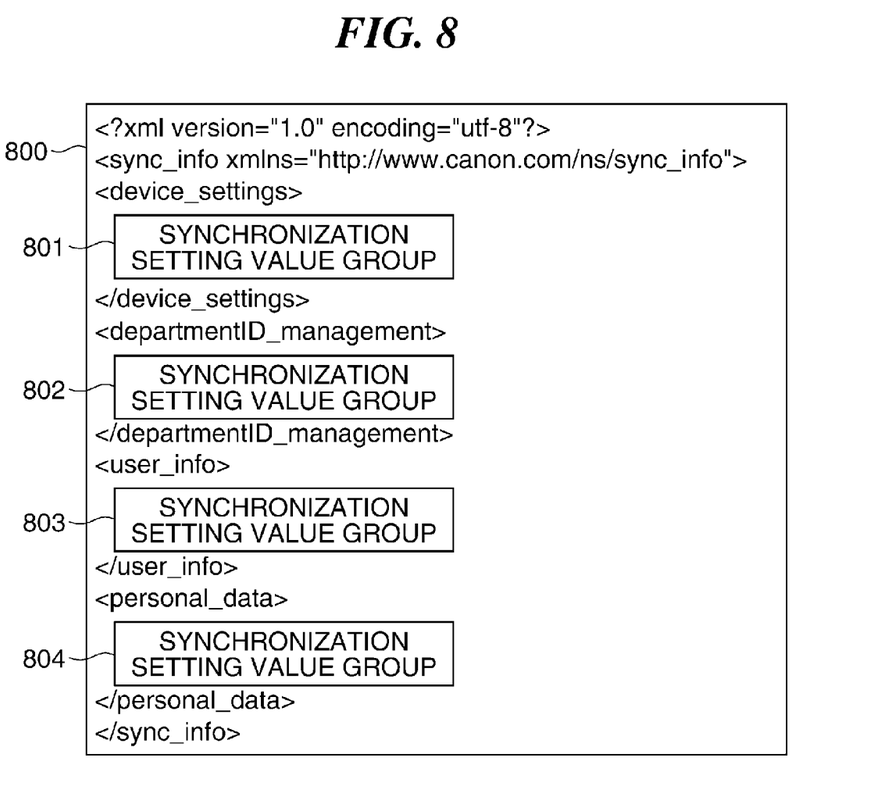
FIG. 8 is a diagram showing an example of synchronization data transmitted from a server appearing in FIG. 1.

In this paragraph, In this paragraph, an explanation of a communication system of a related art is described. Here, a description will be given of a case where synchronization target setting values set in the printed sheet count management data 600 in which the synchronization target setting values and the replacement unrequired setting values are mixed are synchronized based on the synchronization data 800, described hereinafter, which is acquired from the server 104. In this case, to update setting values set as the department ID 601, the total output upper limit 603, and the color output upper limit 605, which are synchronization target setting values, assuming that the setting values are collectively deleted, setting values set as the total output count 602 and the color output count 604, which are replacement unrequired setting values associated with the synchronization target setting values, are also deleted as shown in FIG. 6B. After that, the setting values of the department ID 601, the total output upper limit 603, and the color output upper limit 605 are updated to new setting values based on the synchronization data 800, described hereinafter. However, the setting values of the total output count 602 and the color output count 604 are not included in the synchronization data 800, and hence are each set to e.g. a value of "0". That is, in spite of the fact that the setting values of the total output count 602 and the color output count 604 are replacement unrequired setting values, they are replaced by unintended setting values. To prevent this unnecessary replacement, for example, synchronization target setting values stored in the server 104 and corresponding existing setting values set in the MFP are compared, respectively, and setting values, if any, which each have a difference, are extracted. Further, if any of the extracted setting values is/are each associated with a replacement unrequired setting value, the extracted setting value(s) is/are excluded from the synchronization data 800 to be transmitted from the server 104 to the MFP 101. However, in this method described above, although the replacement unrequired setting value(s) is/are not deleted in synchronization processing, it is necessary to compare each synchronization target setting value stored in the server 104 with a corresponding existing setting value set in the MFP, and determine whether or not there is a difference between the compared setting values. Therefore, as the number of synchronization target setting values to be subjected to the determination is larger, load on synchronization processing becomes larger.

To cope with this, in the present embodiment, when updating the existing setting values, whether or not to collectively delete the synchronization target setting values from the existing setting values is determined based on determination of whether all of the existing setting values are synchronization target setting values or any one of the existing setting values is a replacement unrequired setting value.

Referring to FIG. 7, first, the CPU 201 receives the synchronization data 800 shown in FIG. 8 including synchronization setting value groups formed by a plurality of synchronization target setting values from the server 104 (step S701). The synchronization data 800 is described in XML, and includes the synchronization setting value groups, denoted by reference numerals 801 to 804, respectively, which are grouped according to classification based on the types of the synchronization target setting values stored in the server 104. For example, the synchronization setting value group 802 enclosed by type tags <departmentIDs> and </departmentIDs>, corresponding to the type of the synchronization target setting values associated with a department, includes synchronization target setting values managed by the department management module 306, such as the printed sheet count management data 600, shown in FIG. 6A. Then, the CPU 201 determines whether or not all of the synchronization target setting values set in the MFP 101 are stored in the server 104 (step S702). In the step S702, for example, if type tags corresponding to all of the synchronization target setting values set in the MFP 101 are included in the synchronization data 800, the CPU 201 determines that all of the synchronization target setting values set in the MFP 101 are stored in the server 104. On the other hand, if a type tag corresponding to one of the synchronization target setting values set in the MFP 101 is not included in the synchronization data 800, the CPU 201 determines that one of the synchronization target setting values set in the MFP 101 is not stored in the server 104.

If it is determined in the step S702 that all of the synchronization target setting values set in the MFP 101 are stored in the server 104, the CPU 201 identifies management data including the synchronization target setting values included in the received synchronization data 800, out of the management data managed by the MFP 101. Then, the CPU 201 determines whether or not all of the setting values included in the management data which has been thus identified (hereinafter referred to as the "identified management data") are synchronization target setting values (step S703) (operation of a determination unit). In the present embodiment, synchronization target determination information indicating whether a setting value corresponding to each setting item is a synchronization target setting value or a replacement unrequired setting value is set for each setting item of various kinds of management data managed by the MFP 101 in advance. The CPU 201 determines whether or not all of the setting values included in the identified management data are synchronization target setting values based on the synchronization target determination information of each setting item of the identified management data.

If it is determined in the step S703 that all of the setting values included in the identified management data are synchronization target setting values, the CPU 201 collectively deletes the setting values included in the identified management data (step S704). Then, the CPU 201 replaces the deleted setting values by the synchronization target setting values included in the synchronization setting value groups 801 to 804 of the received synchronization data 800 (step S705) (operation of a first update unit), followed by terminating the present process.

If it is determined in the step S703 that any of the setting values included in the identified management data is a replacement unrequired setting value, the CPU 201 determines whether or not execution of processing using the replacement unrequired setting value is set (step S706). Processing using a replacement unrequired setting value is, for example, totalization processing for totalizing actual result values of the number of sheets printed by each department, using the setting values of the total output count 602 and the color output count 604, which are replacement unrequired setting values, included in the printed sheet count management data 600. In the present embodiment, execution of totalization processing can be set by a user's operation on the console section 209 in advance. In the step S706, if "ON" for instructing execution of totalization processing is set, the CPU 201 determines that execution of processing using the replacement unrequired setting value is set. On the other hand, if "OFF" for not instructing execution of totalization processing is set, the CPU 201 determines that execution of processing using the replacement unrequired setting value is not set.

Figure 6D:
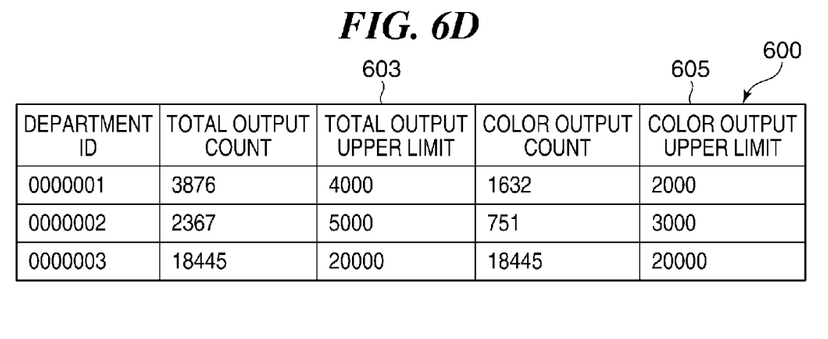
Figure 9:
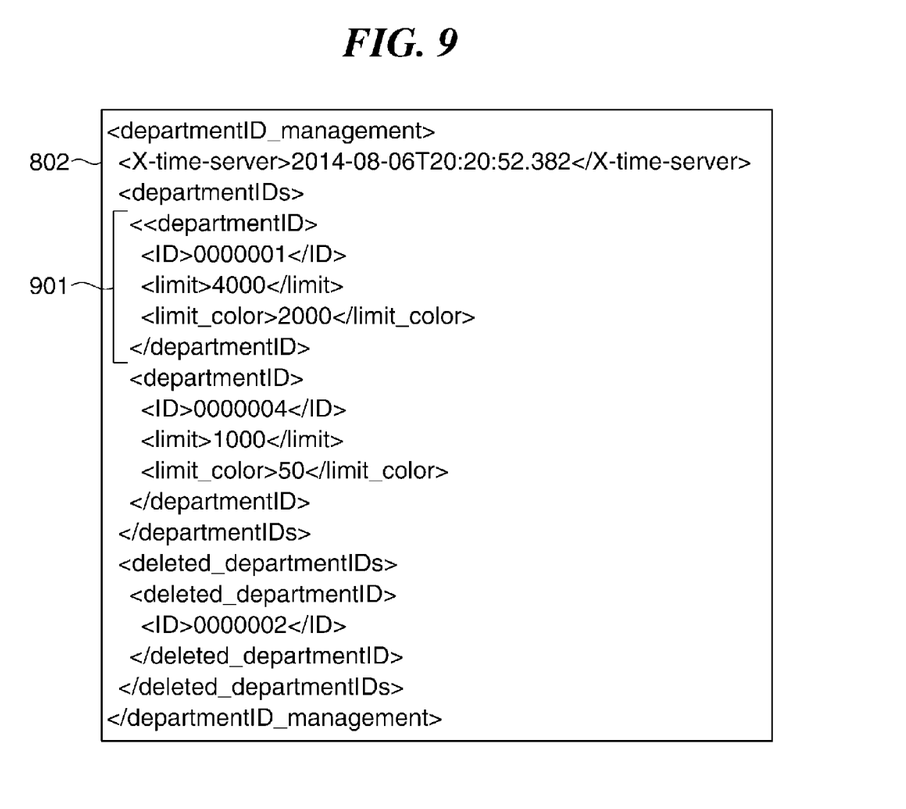
FIG. 9 is a diagram showing an example of a synchronization setting group included in the synchronization data shown in FIG. 8.

If it is determined in the step S706 that execution of processing using the replacement unrequired setting value is not set, the CPU 201 executes the step S704. On the other hand, if it is determined in the step S706 that execution of processing using the replacement unrequired setting value is set, the CPU 201 does not collectively delete the setting values included in the identified management data. That is, in the present embodiment, when updating the setting values included in the identified management data, whether or not to collectively delete the synchronization target setting values included in the synchronization setting value groups 801 to 804 from the identified management data is determined based on determination of whether all of the setting values included in the identified management data are synchronization target setting values or any of the setting values included in the identified management data is a replacement unrequired setting value (operation of a decision unit). The CPU 201 updates the setting values included in the identified management data, individually for each synchronization target setting value included in the synchronization setting value groups 801 to 804 of the synchronization data 800 (step S707) (operation of a second update unit). For example, the CPU 201 updates only some of the synchronization target setting values of the printed sheet count management data 600, based on description 901 enclosed by tags <departmentIDs> and </departmentIDs>, appearing in FIG. 9, which corresponds to setting values to be replaced, out of the synchronization target setting values included in the synchronization setting value group 802 of the synchronization data 800. Specifically, in the printed sheet count management data 600, only the setting value of the total output upper limit 603 of "ID0000001" and the setting value of the color output upper limit 605 are updated from the setting values appearing in FIG. 6A to those appearing in FIG. 6D. Then, the CPU 201 terminates the present process.

If it is determined in the step S702 that at least one of the synchronization target setting values set in the MFP 101 is not stored in the server 104, the CPU 201 identifies a synchronization target setting value which is not stored in the server 104. Then, the CPU 201 transmits the identified synchronization target setting value to the server 104 (step S708), followed by terminating the present process. The server 104 having received the synchronization target setting value stores the received synchronization target setting value as a new synchronization target setting value.

According to the above-described process in FIG. 7, when updating setting values included in the identified management data, whether or not to collectively delete the synchronization target setting values included in the synchronization setting value groups 801 to 804 from the identified management data is determined based on determination of whether all of the setting values included in the identified management data are synchronization target setting values or any of the setting values included in the identified management data is a replacement unrequired setting value. With this, it is possible to eliminate the need of comparing each synchronization target setting value included in the synchronization setting value groups 801 to 804 with each setting value included in the identified management data one by one, and determining whether or not there is a difference between the compared setting values so as to determine whether or not to delete the synchronization target setting values included in the synchronization setting value groups 801 to 804 from the setting values included in the identified management data. As a consequence, it is possible to prevent the load on synchronization processing from increasing more than necessary.

Further, in the above-described process in FIG. 7, whether or not all of the setting values included in the identified management data are synchronization target setting values is determined based on the synchronization target determination information of each setting item. This makes it possible to eliminate, when determining whether or not all of the setting values included in the identified management data are synchronization target setting values, the need of performing determination using each setting value itself, whereby it is possible to reduce the load on the determination processing.

Further, in the above-described process in FIG. 7, in a case where any of the setting values included in the identified management data is a replacement unrequired setting value, and also execution of processing using the replacement unrequited setting value is set, execution of update processing in the step S707 in which the setting values included in the identified management data are not collectively deleted is determined. This makes it possible to prevent an inaccurate result of execution of processing using the replacement unrequired setting value due to replacement of the replacement unrequired setting value.

Although in the present embodiment, the description is given of the case where the synchronization target determination information is set for each setting item of the various kinds of management data, other synchronization target determination information indicative of whether or not a replacement unrequired setting value is included may be set in each kind of management data itself. In this case, the CPU 201 determines whether or not all of setting values included in the identified management data are synchronization target setting values based on the other synchronization target determination information. In a case where the other synchronization target determination information is used as well, it is possible to obtain the same advantageous effects as provided by the above-described present embodiment.

Further, in the present embodiment, even in a case where initialization processing for deleting setting values included in the identified management data is performed, it is unnecessary to delete replacement unrequired setting values (unique setting values) associated with the setting values included in the identified management data. A setting value-updating process, described below with reference to FIG. 10, is a variation of the present embodiment adapted to the above-mentioned case.

Figure 10:
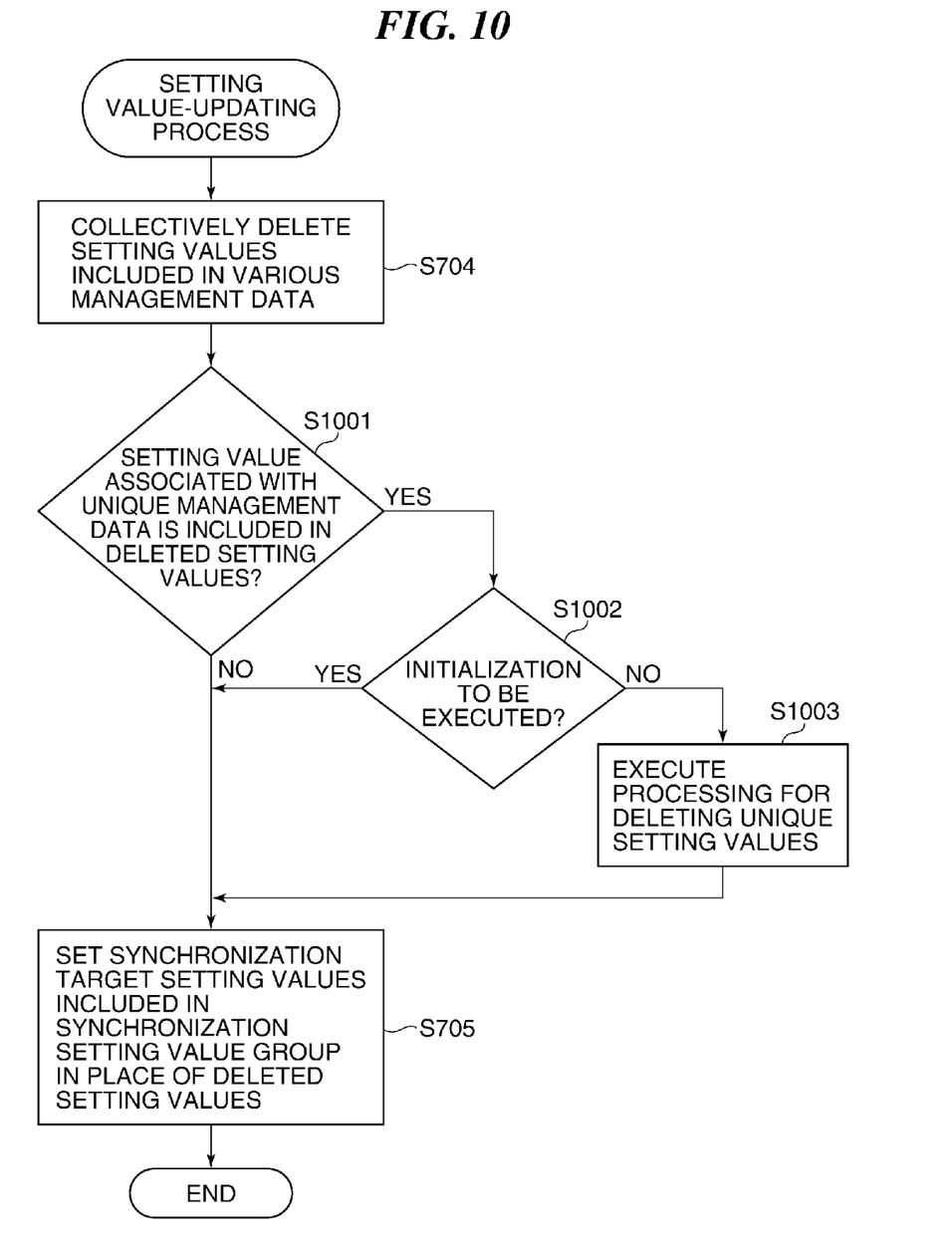
FIG. 10 is a flowchart of a setting value-updating process performed by the MFP appearing in FIG. 1.

FIG. 10 is a flowchart of the setting value-updating process as a variation of part of the synchronization process in FIG. 7, which is performed when the synchronization process in FIG. 7 is performed and the process proceeds to the step S704, in a case where unique management data formed only by unique setting values is stored in the HDD 204 of the MFP 101 appearing in FIG. 1 in association with the setting values. As is clear from the fact that the process is started from the step S704, this variation is supplementary to an exceptional process performed in a case where setting values are collectively deleted in the process in FIG. 7, and differs from the above-described embodiment in that in a case of initialization processing, replacement unrequired setting values (unique setting values) associated with the setting values included in the identified management data are not deleted.

Referring to FIG. 10, first, the CPU 201 executes the step S704 in FIG. 7, and then determines whether or not there is a setting value in the deleted setting values, which is associated with the unique management data formed only by unique setting values (step S1001).

If it is determined in the step S1001 that there is a setting value in the deleted setting values, which is associated with the unique management data, the CPU 201 determines whether or not initialization processing is to be performed (step S1002). Initialization processing is processing for deleting setting values included in identified management data which is identified as management data including synchronization target setting values, and is performed e.g. when the MFP 101 and the server 104 perform first synchronization processing, or when the network 105 is once disconnected and then the MFP 101 and the server 104 are reconnected. Normally, when setting values included in the identified management data are deleted, the CPU 201 also deletes unique setting values associated with the deleted setting values from the unique management data.

If it is determined in the step S1002 that initialization processing is not performed, the CPU 201 performs unique setting value deletion processing for deleting the unique setting values associated with the deleted setting values from the unique management data (step S1003). Then, the CPU 201 executes the step S705 in FIG. 7, followed by terminating the present process.

If it is determined in the step S1001 that there is no setting value associated with the unique management data in the deleted setting values, or if it is determined in the step S1002 that initialization processing is performed, the CPU 201 executes the step S705 in FIG. 7.

In the above-described process in FIG. 10, even when initialization processing for deleting setting values included in the identified management data is performed, replacement unrequired setting values are not deleted. This makes it possible to prevent replacement unrequired setting values from being unnecessarily deleted and replaced.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (RD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-189539 filed Sep. 28, 2015, which is hereby incorporated by reference herein in its entirety.

What is claimed is:

1. A communication system that performs synchronization processing for receiving a synchronization setting value group including setting values to be synchronized, and updating existing setting values based on the received synchronization setting value group, comprising at least one processor and at least one memory coupled to the at least one processor which act as:
a determination unit configured to determine whether or not all of the existing setting values are the setting values to be synchronized;
a first update unit configured to perform first update processing in which setting values included in the synchronization setting value group are collectively deleted from the existing setting values, and the setting values included in the synchronization setting value group are set in place of the deleted setting values;
a second update unit configured to perform second update processing in which the existing setting values are updated, individually for each setting value included in the synchronization setting value group without collectively deleting the setting values included in the synchronization setting value group from the existing setting values; and
a decision unit configured to decide execution of update processing by said first update unit in a case where all of the existing setting values are the setting values to be synchronized, and decide execution of update processing by said second update unit in a case where any of the existing setting values is a setting value which is not required to be replaced.

2. The communication system according to claim 1, wherein the existing setting values include setting items for classifying types of a plurality of setting values included in the existing setting values,
wherein synchronization target determination information indicative of whether or not an associated one of the setting values is to be synchronized is set for each of the setting items, and
wherein said decision unit decides, based on the synchronization target determination information of each of the setting items, whether or not all setting values included in the existing setting values are the setting values to be synchronized.

3. The communication system according to claim 1, wherein other synchronization target determination information indicating that any of the existing setting values is a setting value which is not required to be replaced is set for the existing setting values, and
wherein said decision unit decides, based on the other synchronization target determination information, whether or not all setting values included in the existing setting values are the setting values to be synchronized.

4. The communication system according to claim 1, wherein in a case where any of setting values included in the existing setting values is a setting value which is not required to be replaced, and also execution of processing using the setting value which is not required to be replaced is set, said decision unit decides execution of the update processing by said second update unit.

5. The communication system according to claim 1, wherein even when initialization processing for deleting the setting values included in the existing setting values is performed, the setting value which is not required to be replaced is not deleted.

6. The communication system according to claim 1, wherein the communication system is an information processing apparatus.

7. A communication method for performing synchronization processing for receiving a synchronization setting value group including setting values to be synchronized, and updating existing setting values based on the received synchronization setting value group, comprising:
determining whether or not all of the existing setting values are the setting values to be synchronized;
performing first update processing in which setting values included in the synchronization setting value group are collectively deleted from the existing setting values, and the setting values included in the synchronization setting value group are set in place of the deleted setting values;
performing second update processing in which the existing setting values are updated, individually for each setting value included in the synchronization setting value group without collectively deleting the setting values included in the synchronization setting value group from the existing setting values; and deciding execution of the first update processing in a case where all of the existing setting values are the setting values to be synchronized, and deciding execution of the second update processing in a case where any of the existing setting values is a setting value which is not required to be replaced.

8. A non-transitory computer-readable storage medium storing a computer-executable program for executing a communication method for performing synchronization processing for receiving a synchronization setting value group including setting values to be synchronized, and updating existing setting values based on the received synchronization setting value group, wherein the method comprises:

determining whether or not all of the existing setting values are the setting values to be synchronized;

performing first update processing in which setting values included in the synchronization setting value group are collectively deleted from the existing setting values, and the setting values included in the synchronization setting value group are set in place of the deleted setting values;

performing second update processing in which the existing setting values are updated, individually for each setting value included in the synchronization setting value group without collectively deleting the setting values included in the synchronization setting value group from the existing setting values; and deciding execution of the first update processing in a case where all of the existing setting values are the setting values to be synchronized, and deciding execution of the second update processing in a case where any of the existing setting values is a setting value which is not required to be replaced.

\* \* \* \* \*